United States Patent [19]

Delalle

[11] Patent Number: 5,431,758
[45] Date of Patent: Jul. 11, 1995

[54] ARRANGEMENT FOR FORMING A SEALED ELECTRICAL SPLICE

[75] Inventor: Jacques Delalle, Triel, France
[73] Assignee: Raychem SA, France
[21] Appl. No.: 150,165
[22] PCT Filed: Jun. 5, 1992
[86] PCT No.: PCT/GB92/01013
§ 371 Date: Nov. 30, 1993
§ 102(e) Date: Nov. 30, 1993
[87] PCT Pub. No.: WO92/22105
PCT Pub. Date: Dec. 10, 1992

[30] Foreign Application Priority Data

Jun. 6, 1991 [GB] United Kingdom ............... 9112182
Mar. 6, 1992 [GB] United Kingdom ............... 9204943

[51] Int. Cl.⁶ .................... H01R 04/60; H01R 04/22
[52] U.S. Cl. ................................. 156/49; 156/52; 439/523; 174/84 R
[58] Field of Search ............... 174/86, 87, 89, 84; 156/47, 49, 51, 52; 439/523

[56] References Cited

U.S. PATENT DOCUMENTS

| | | | |
|---|---|---|---|
| 3,597,528 | 8/1971 | Penfield | 174/87 |
| 3,821,464 | 6/1974 | Connan | 174/87 |
| 3,934,076 | 1/1976 | Smith | 174/87 |
| 3,937,870 | 2/1976 | Bumpstead et al. | 174/87 |
| 4,039,742 | 8/1977 | Smith | 174/87 |
| 4,070,543 | 1/1978 | Thompson et al. | 174/87 |
| 4,163,082 | 7/1979 | Romenesko | 428/447 |
| 4,163,868 | 8/1979 | Stotts | 174/87 |
| 4,227,040 | 10/1980 | Scott | 174/87 |
| 4,504,699 | 3/1985 | Dones et al. | 174/84 R |
| 4,600,804 | 7/1986 | Howard | 174/84 C |
| 4,647,717 | 3/1987 | Uken | 174/84 C |
| 4,662,692 | 5/1987 | Uken et al. | 339/96 |
| 4,718,678 | 1/1988 | Vansant | 277/1 |
| 4,721,832 | 1/1988 | Toy | 174/87 |
| 4,783,227 | 11/1988 | Meadore | 156/49 |
| 4,864,725 | 9/1989 | Debbaut | 29/871 |
| 4,883,431 | 11/1989 | Uken et al. | 439/521 |
| 5,023,402 | 6/1991 | King, Jr. et al. | 174/87 |
| 5,113,037 | 5/1992 | King, Jr. et al. | 174/87 |

FOREIGN PATENT DOCUMENTS

| | | | |
|---|---|---|---|
| 0432662A1 | 6/1991 | European Pat. Off. | H01R 4/22 |
| 2388422 | 11/1978 | France . | |
| 54-30609 | 9/1979 | Japan . | |
| 2215921A | 9/1989 | United Kingdom | H02G 15/04 |
| WO86/06561 | 11/1986 | WIPO | H02G 15/04 |

OTHER PUBLICATIONS

Dri-Splice Wire Connector brochure Feb. 1987.

*Primary Examiner*—Michael W. Ball
*Assistant Examiner*—Francis J. Lorin
*Attorney, Agent, or Firm*—Sheri M. Novack; Herbert G. Burkard

[57] ABSTRACT

An arrangement for forming a stub splice between two or more elongate electrical conductors comprises a hollow electrical connector and a hollow cap containing a quantity of gel. In use, the cap engages an open end of the connector, and the elongate conductors extend through the open end of the connector and through one or more apertures contained in the cap. Once the cap is engaged, the gel is compressed and the splice is sealed against moisture ingress. In order to ensure that the gel is maintained under compression, the cap may optionally contain a quantity of non-gelatinous resiliently compressible material which substantially compensates for any changes in the volume of gel.

10 Claims, 2 Drawing Sheets

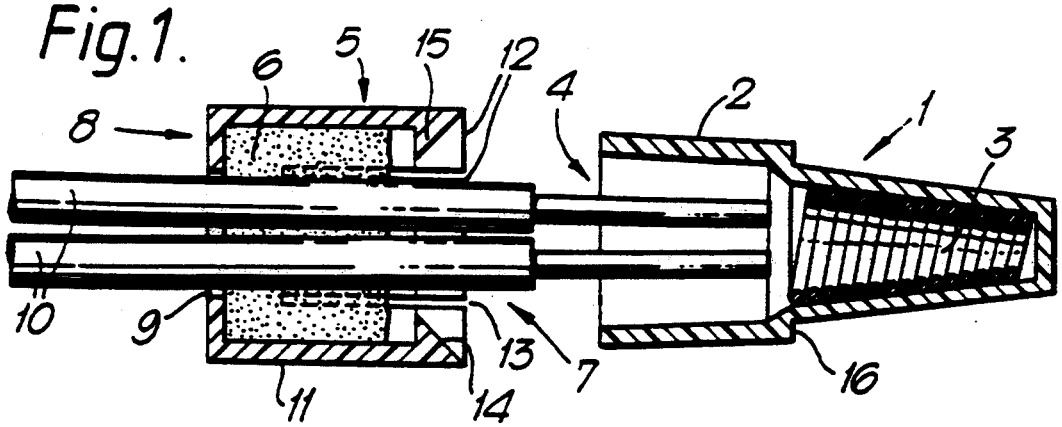
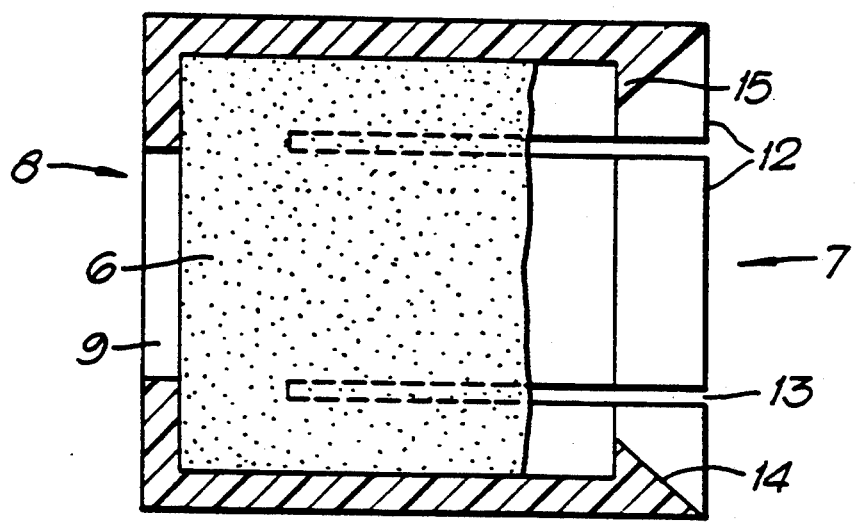
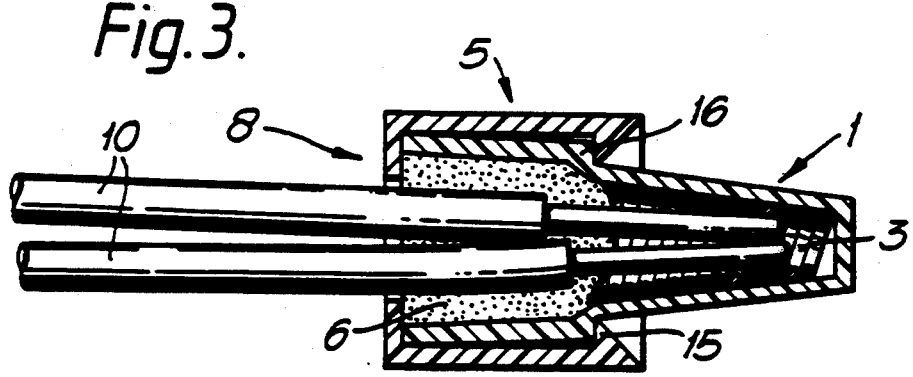

ARRANGEMENT FOR FORMING A SEALED ELECTRICAL SPLICE

This invention relates to arrangements for forming sealed electrical splices between two or more elongate electrical conductors.

There are many different ways known in the art, of forming sealed electrical splices between elongate electrical conductors. Some methods for example involve the use of adhesives and heat-recoverable polymers, whereas others involve the use of encapsulating materials such as grease, or curable or pre-cured encapsulating materials. The use of pre-cured encapsulants such as gels, is often desirable since usually no mixing of chemicals or application of heat is necessary to produce a sealed splice. Furthermore, gels have an advantage over grease in that they are less likely to flow out of the splice and expose it to corrosion.

In the past, electrical connectors incorporating gels have often tended to be more complicated than simple traditional connectors. Consequently, for many purposes simple traditional connectors which do not provide any great degree of protection against corrosion continue to be used.

We have discovered a way of sealing traditional types of connectors, by means of a gel-containing cap which seals the open end of such connectors and allows elongate electrical conductors to extend through it into the connector.

The invention provides an arrangement for forming a stub splice between two or more elongate electrical conductors, comprising: a hollow electrical connector having an insulating connector body containing a connecting element, the connector having an open end to allow insertion of the elongate conductors; a hollow cap which is capable of engaging the connector and at least partially closing its open end, the cap having an open end and a closed end, the closed end containing one or more apertures to allow the elongate conductors to extend through it into the connector; and a quantity of gel contained in the cap to seal the splice from moisture ingress.

The invention also provides a method of forming a stub splice between two or more elongate electrical conductors, by means of an arrangement according to the invention. The method includes passing the ends of the conductors through the apertures in the cap and through the gel, so that they extend beyond the open end of the cap; connecting the ends of the conductors in the connecting element of the electrical connector; and engaging the cap with the connector so as to close the splice and seal it from moisture ingress.

The invention further provides a hollow cap for closing and sealing an electrical connector, the cap having an open end and a closed end, the closed end containing one or more apertures to allow one or more elongate conductors to extend through it into the connector, the cap containing a quantity of gel for sealing the connector against moisture ingress.

The arrangement according to the invention enables a sealed stub splice to be produced using any one of several types of conventional electrical connectors which, when used by themselves, do not provide protection against corrosion of the conductors. The types of connectors which may be used are well known in the art, and include crimp connectors and connectors which allow conductors to be screwed into them, such as, for example those manufactured by Legrand and 3M.

A preferred arrangement according to the invention includes an electrical connector containing a connecting element which has a tapering internal surface provided with a screw thread to allow the elongate electrical conductors to be connected by screwing them into the connector. The connecting element may for example comprise a tapering coil of wire, the screw thread being the internal surface of the coil. Alternatively, the connecting element may for example comprise a conical frustum containing an internal screw thread.

The connecting element will normally be formed from an electrical conductor, and in particular a metal or metal alloy, to aid electrical connection of the elongate conductors. The connecting element may, for example, be formed from copper or a copper alloy. The copper or other metal may be tin-plated so as to reduce the risk of galvanic corrosion between the elongate conductors and the connecting element, when tin-plated elongate conductors are to be connected. Alternatively, the connecting element may be formed from steel or some other metal or metal alloy which is hard in comparison to copper. This has the advantage that when a connecting element with an internal screw thread is used, copper wires or cables for example may be screwed into it.

The function of the gel contained in the cap is to seal a splice formed by means of the arrangement, against moisture ingress. This is achieved by the cap engaging the open end of the connector and causing at least part of the gel contained in the cap to be located between the connecting element and the closed end of the cap. This gel may remain entirely within the cap, but it is often desirable for at least some of it to be transferred into the connector itself. It is therefore often preferable for the insulating connector body to extend beyond the connecting element in the direction of the open end of the electrical connector. This then provides a space in which the gel can be contained once the splice has been formed. For some arrangements according to the invention, once the conductors have been inserted into the connecting element and the cap has been engaged with the connector, the gel preferably fills or substantially fills this space.

The connector body is preferably formed from a tough insulating plastics material. The types of materials which are normally used are well known in the art, and include thermosetting plastics, such as Melamine and Bakelite (Trademark) for example.

The arrangement according to the invention includes a hollow cap, which, with the aid of the gel contained within it, is intended to close the open end of the electrical connector and seal it against moisture ingress, whilst allowing the elongate electrical conductors to extend through the cap into the connector. This is made possible by the closed end of the cap containing one or more apertures to accommodate the elongate conductors.

The cap is preferably formed from a flexibly resilient material, for example a thermoplastic material. More preferably, the cap is formed from a nylon, for example nylon 6 or nylon 6.6, or alternatively from high density polyethylene for example.

The cap is capable of engaging the connector, preferably by means of an internal profile which is capable of interlocking with the insulating connector body of the electrical connector. The internal profile of the cap may for example comprise one or more projections, shoulders or ledges which are capable of engaging one or more recesses incorporated in the insulating connector body of the electrical connector. The term "recess" is intended to include any form of indentation, and includes those formed by means of a shoulder or ledge etc. For example, the electrical connector may contain a shoulder with which one or more projections contained in the cap are able to locate, to prevent the cap from being accidentally disengaged from the connector during its use. Alternatively, the insulating connector body of the electrical connector may have a series of teeth or ledges arranged such that the cap may engage the connector at any one of several positions.

For some types of connectors however, it may be desirable for the cap to be made to engage the connector in any one of several alternative ways. For example, the cap may contain a screw thread which will allow it to be screwed onto a connector containing an accommodating screw thread. Alternatively, the electrical connector may contain one or more projections which are capable of interlocking with one or more recesses contained in the cap.

In a preferred embodiment of the invention, the cap has a circumferentially extending side wall that is at least partially divided into a plurality of sections that are defined by one or more slits extending from its open end. The phrase "circumferentially extending side wall" is intended to mean the region of the material of the cap located between its open end and its closed end, and the term "circumferentially" is not intended to limit the side wall to one having a circular or substantially circular cross-section, although this may often be desirable.

The sections of the side wall preferably have a degree of resilient flexibility in a transverse direction. This is so as to allow the cap to be pushed onto an electrical connector and positively lock with it. Thus, for example, the resilient flexible sections of the cap may be capable of being splayed outwards whilst the cap is pushed onto the connector, but once the internal profile of the cap reaches its corresponding recesses in the connector, the sections are then capable of springing back to their original positions to allow the internal profile to interlock with the recesses of the connector.

A convenient arrangement is one in which the connector body of the electrical connector contains a series of teeth or ledges arranged such that the cap may be pushed onto the connector so that its internal profile interlocks with a first recess (or set of recesses), and depending on the amount of gel contained in the cap, and on the size of the conductors which are to be connected, the cap may be pushed further onto the connector (splaying the resilient flexible sections of the cap outwards once more) until the internal profile of the cap interlocks with a second, or any successive, recess (or set of recesses). In this way, it is possible to compensate for variations in the size of conductors which are to be connected, and also to compensate for any variation in the amount of gel contained in caps made according to the invention, because the cap may be pushed onto the connector sufficiently to form a sealed splice, but need not be pushed so far onto the connector that gel is forced out of the splice.

In a particularly preferred embodiment of the invention, the cap is substantially cylindrical. Most preferably, at least a portion of the connector body which extends beyond the connecting element in the direction of the open end of the electrical connector also has a circular cross-section, being either substantially cylindrical or substantially frusto-conical. The connector body most preferably either contains a shoulder or ledge, with which one or more projections contained in the cap are capable of interlocking, or it contains a series of teeth or ledges with which the cap's projection(s) is capable of interlocking in turn, as the cap is pushed onto the connector.

The cap is able to seal a splice against moisture, by virtue of the gel contained in it. The term "gel" as used herein is intended to mean a liquid-extended polymer composition. Such compositions normally contain a three-dimensional network of cross-linked molecular chains and preferably include at least 300 parts, more preferably at least 500 parts by weight of extender liquid per 100 parts by weight of the polymer composition. The gel used in the invention preferably has a cone penetration value (measured by ASTM D217) within the range of from 100 to 400 $10^{-1}$ millimeters, more preferably 100 to 350 $10^{-1}$ millimeters; an ultimate elongation (measured by ASTM D412) preferably greater than 100%, with substantially elastic deformation to an elongation of preferably at least 100%; and ultimate tensile strength (ASTM D412) preferably less than 1 MegaPascal.

The polymer composition may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent publication number WO88/00603. The extender liquids employed in the gel preferably comprise oils conventionally used to extend elastomeric materials. The oils may be hydrocarbon oils, for example paraffinic or naphthenic oils, synthetic oils for example polybutene or polypropene oils, and mixtures thereof. The preferred oils are mixtures of non-aromatic paraffins and naphthenic hydrocarbon oils. Suitable gels can also be prepared by curing reactive silicones with non-reactive extender silicones. The gel may contain known additives such as moisture scavengers (eg. benzoyl chloride), antioxidants, pigments and fungicides.

The gel is resiliently deformable, and when compressed is capable of flowing and conforming around intricate shapes and adhering to solid surfaces. The gel is also capable of being pierced by sharp objects (such as elongate electrical conductors for example) and when so pierced tends to conform to the piercing object. These properties are exploited in this invention to produce a moisture seal.

In use, an arrangement according to the invention may be subject to severe variations in temperature, which may cause the volume of the gel to change. In a splice formed according to the invention in which the gel is initially under compression, a change in temperature may cause the gel to contract and hence the moisture seal may be broken. Alternatively, the gel may expand and at least partially escape from the splice, so that if it subsequently contracts, the moisture seal may not be maintained.

It is therefore often advantageous to include in the cap means for substantially compensating for changes in the volume of gel contained in a splice formed according to the invention. For example, the cap may contain a quantity of non-gelatinous resiliently compressible material, which is at least partially compressed when the gel is compressed, and which expands in an attempt to regain its original shape if the gel contracts. In most cases, expansion of the non-gelatinous material substantially compensates for contraction of the gel, and helps to maintain the gel under compression. Alternatively, if the gel expands it may compress the material further, and hence the expansion may be substantially accommodated without the gel escaping from the cap.

Preferably, the non-gelatinous resiliently compressible material comprises a foamed polymer, more preferably a closed cell foamed polymer. For example, latex foam rubber, expanded natural rubber, expanded butyl rubber, expanded acrylonitrile butadiene rubber, expanded styrene-butadiene rubber, polyvinylchloride, polyurethanes and silicones may be used.

The quantity of non-gelatinous resiliently compressible material may comprise one or more pieces of the material in the form of a spheroid, sphere, polyhedron, pad or sheet for example. The material may be in the form of a plurality of spheroids or spheres located partially or entirely within the gel, the spheroids or spheres preferably having a diameter of at least 0.5 mm, more preferably 0.8 mm, and preferably no more than 5 mm, more preferably no more than 1.5 mm. Preferably, however, the material is in the form of one or more pads or sheets which are located inside the cap, preferably substantially between the quantity of gel and the closed end of the cap. More preferably, the material comprises a single pad which covers substantially the entire inner surface of the closed end of the cap, so that substantially the entire quantity of gel is located between the pad and the open end of the cap.

It is of course necessary for the non-gelatinous material to allow the elongate conductors to extend through the cap when in use, and to facilitate this it is often preferable to provide one or more apertures in the non-gelatinous material, through which the elongate conductors may extend. It is not normally necessary or desirable for the aperture(s) to be large enough to accommodate the elongate conductors without distortion of the material; because of the compressible nature of the material, it is normally possible merely to provide one or more slits which open out to accommodate the conductors.

As stated above, the invention also provides a method of forming a stub splice between two or more elongate conductors, by means of an arrangement according to the invention, the method comprising:
 (i) stripping any insulation from the end of each conductor;
 (ii) passing the ends of the conductors through the apertures in the cap and through the gel, so that they extend beyond the open end of the cap;
 (iii) connecting the ends of the conductors in the connecting element of the electrical connection; and
 (iv) engaging the cap with the connector so as to close the splice and seal it from moisture ingress.

Engaging the cap with the connector preferably causes at least a portion of the gel to be located between the connecting element and the closed end of the cap, and more preferably it causes at least some of the gel contained in the cap to be forced into the electrical connector, so as to provide a barrier between the electrical splice and the external environment. In order to ensure a well sealed splice, it is furthermore preferable for the gel to be compressed in the region between the connecting element and the closed end of the cap, so that the gel substantially fills this region.

The invention will now be described by way of example with reference to the accompanying drawings, in which:

FIG. 1 is a sectional elevation of an arrangement according to the invention, together with a pair of insulated solid wires;

FIG. 2 is a sectional elevation of a cap containing a quantity of gel, according to the invention;

FIG. 3 is a sectional elevation of a stub splice between two insulated solid wires formed by the arrangement of FIG. 1;

Figure 4:
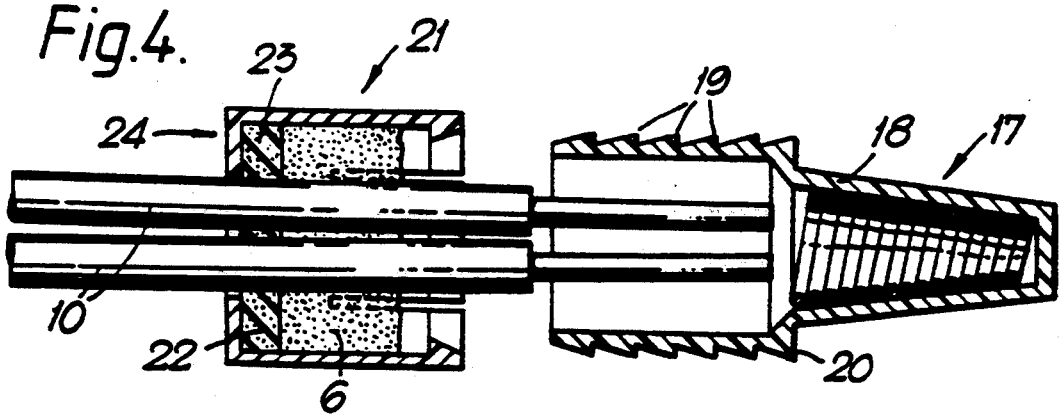
FIG. 4 is a sectional elevation of another arrangement according to the invention, together with a pair of insulated solid wires.

FIG. 1 shows a sectional elevation of an arrangement according to the invention, comprising: a hollow electrical connector 1 having an insulating connector body 2 containing a connecting element 3, the connector having an open end 4; and a hollow cap 5 containing a quantity of gel 6, the cap having an open end 7 and a closed end 8, the closed end containing an aperture 9. Also shown are two insulated solid wires 10, extending through the cap's aperture and through the gel, into the connector body of the electrical connector. The connecting element is formed from a tapering coil of wire, the internal surface of the coil thus forming a screw thread, into which the solid wires may be screwed. The cap has a circumferentially extending side wall 11 that is partially divided into a plurality of sections 12 that are defined by one or more slits 13 extending from it's open end the sections being capable of being splayed outwards, thus enabling the cap to be pushed onto the electrical connector. In order to facilitate this, the extreme end surface 14 of the side wall at the open end of the cap is bevelled outwards. The side wall of the cap also contains projections 15 (in the form of rearwardly facing internal shoulders) which are intended to engage a shoulder 16 incorporated in the connector body of the electrical connector.

FIG. 2 shows a cap according to the invention, identical to that contained in the arrangement shown in FIG. 1.

FIG. 3 shows a sealed stub splice between two insulated solid wires, formed by means of the arrangement shown in FIG. 1. In this figure, the two insulated solid wires 10 have been screwed into the connecting element 3 of the electrical connector 1, and the hollow cap 5 has been pushed onto the electrical connector. The projections 15 of the cap have engaged the shoulder 16 of the connector body of the electrical connector, and the quantity of gel 6, originally contained in the cap, has been forced into the connector body, between the closed end 8 of the cap and the connecting element.

FIG. 4 shows a sectional elevation of an arrangement according to the invention which is similar to that shown in FIG. 1, but which differs in two main respects. Firstly, the insulating connector body 18 of the electrical connector 17 contains a series of ledges 19, as well as a shoulder 20 (which is similar to the shoulder 16 of the electrical connector of FIG. 1). Secondly, the hollow cap 21 containing gel 6 additionally contains a pad of foamed polymeric material 22 located between the gel and the inner surface 23 of the closed end 25 of the cap. This can be seen more clearly in FIG. 5.

Figure 5:
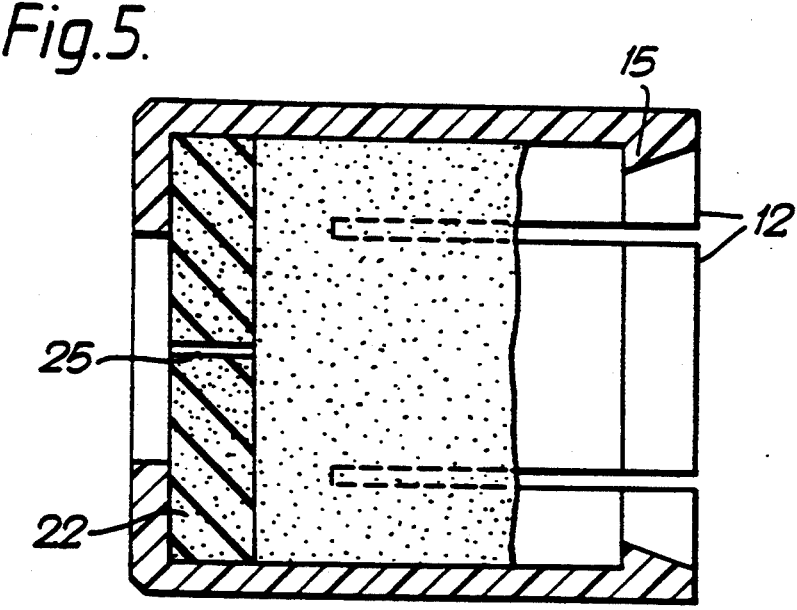
FIG. 5 is a sectional elevation of a cap containing a quantity of gel and a pad of foamed polymeric material.

FIG. 5 shows a sectional elevation of a cap according to the invention which is similar to that contained in FIG. 4, but in which the pad 22 is shown rotated through 90°. This view shows a slit 25 contained in the pad 22, through which the insulated solid wires 10 of FIG. 4 have been passed.

Figure 6:
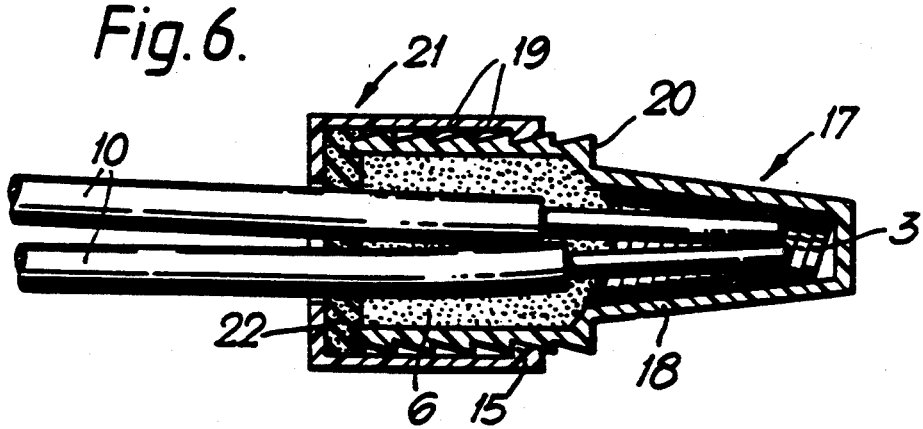
FIG. 6 is a sectional elevation of a stub splice between two insulated solid wires formed by the arrangement of FIG. 4.

FIG. 6 shows a sealed stub splice between two insulated solid wires 10, formed by means of the arrangement shown in FIG. 4. This stub splice is similar to that shown in FIG. 3, in that the two insulated solid wires 10 have been screwed into the connecting element 3 of the electrical connector 17, the hollow cap 21 has been pushed onto the electrical connector and the quantity of gel 6, originally contained in the cap, has been forced into the connector body 18 of the connector. However, in this case the connector body contains a series of ledges 19 as well as the shoulder 20, and the projections 15 of the cap have engaged one of these ledges. Also, the act of pushing the cap 21 onto the connector 17 and forcing the gel 6 into the connector body 18 has not only compressed the gel, it has also compressed the pad of foamed polymeric material 22 which acts as a buffer to compensate for expansion or contraction of the gel, as explained above.

The fact that the electrical connector of the embodiment of the invention shown in FIGS. 4 and 6 contains a series of ledges having a saw-tooth cross-section means that the cap and connector have a ratchet mechanism which allows the cap to be pushed on to the connector far enough so that the gel is compressed (but not so far that the gel is forced out of the cap) and which prevents the cap being removed from the connector without the sections 12 of the cap being splayed outwards.

I claim:

1. An arrangement for forming a stub splice between at least two elongated electrical conductors, the arrangement comprising:
   (a) a hollow electrical connector having (i) an insulating connector body containing a connecting element, that is arranged, in use, to form a connection with the elongated conductors, (ii) an open end to allow insertion thereinto of the elongated conductors, and (iii) at least one recess incorporated in a wall thereof;
   (b) a hollow cap that (i) has an open end and a closed end, the closed end containing at least one aperture to allow the elongated conductors to extend through said cap and to project into said connector, (ii) has an internal profile that comprises at least one projection that is arranged to interlock with said at least one recess of said connector body, whereby the cap at least partially closes said open end of said connector body;
   (c) a quantity of gel that is contained in said cap to thereby seal said connection of the conductors from moisture ingress; and
   (d) a quantity of non-gelatinous resiliently-compressible material that is contained in said cap to thereby continuously exert pressure on said gel to maintain the moisture sealing of said connection.

2. An arrangement as claimed in a claim 1, wherein the connecting element has a tapering internal surface provided with a screw thread to allow the elongate electrical conductors to be connected by screwing them into the connector.

3. An arrangement as claimed in claim 1, wherein the insulating connector body extends beyond the connecting element in the direction of the open end of the electrical connector.

4. An arrangement as claimed in claim 1, wherein the recesses incorporated in the insulating connector body formed by means of a series of ledges with which the cap's projection(s) are capable of interlocking in turn, as the cap is pushed onto the connector.

5. An arrangement as claimed in claim 1, wherein the cap has a circumferentially extending side wall that is at least partially divided into a plurality of sections that are defined by one or more slits extending from its open end.

6. An arrangement as claimed in claim 1, wherein the non-gelatinous resiliently compressible material is in the form of one or more pads located substantially between the quantity of gel and the closed end of the cap.

7. An arrangement as claimed in claim 1 wherein the cap is substantially cylindrical.

8. A method of forming a stub splice between two or more elongate electrical conductors, by means of an arrangement as claimed in claim 1, the method comprising:
   (i) stripping any insulation from the end of the conductor;
   (ii) passing the ends of the conductor through the apertures in the cap and through the gel and non-gelatinous material, so that they extend beyond the open end of the cap;
   (iii) connecting the ends of the conductor in the connecting element of the electrical connector; and
   (iv) engaging the cap with the connector so as to close the splice and seal it from moisture ingress.

9. A method as claimed in claim 8, wherein engaging the cap with the connector causes at least some of the gel contained in the cap to be forced into the electrical connector.

10. A stub splice between at least two elongated electrical conductors, which comprises:
   (a) a hollow electrical connector having (i) an open end, (ii) an insulating connector body containing a connecting element in which ends of said conductors have been connected, and (iii) at least one recess incorporated in a wall thereof;
   (b) a hollow cap that (i) has an internal profile comprising at least one projection that is interlocked with said at least one recess of said connector, (ii) has a closed end that contains at least one aperture through which said elongated conductors extend into the connector;
   (c) a quantity of gel, at least a portion of which is located between said connecting element and said closed end of said cap, thereby sealing the splice from ingress of moisture; and
   (d) a quantity of non-gelatinous resiliently-compressible material contained in the cap and exerting pressure on said gel thereby to maintain the moisture sealing of the splice.

* * * * *

UNITED STATES PATENT AND TRADEMARK OFFICE
CERTIFICATE OF CORRECTION

PATENT NO. : 5,431,758
DATED : July 11, 1995
INVENTOR(S) : Jacques Delalle

It is certified that error appears in the above-indentified patent and that said Letters Patent is hereby corrected as shown below:

Column 7 Line 51, replace "dosed" by --closed--.

Column 8, Line 54, replace "dosed" by --closed--.

Signed and Sealed this

Twenty-sixth Day of September, 1995

Attest:

BRUCE LEHMAN

*Attesting Officer*     *Commissioner of Patents and Trademarks*